United States Patent
Oh et al.

(10) Patent No.: US 12,474,335 B2
(45) Date of Patent: Nov. 18, 2025

(54) BIOSENSOR AND PREPARATION METHOD THEREOF

(71) Applicant: LG Chem, Ltd., Seoul (KR)

(72) Inventors: Seung Jun Oh, Daejeon (KR); Hang Beum Shin, Daejeon (KR); Hun Park, Daejeon (KR); Jun Ki Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1199 days.

(21) Appl. No.: 17/295,587

(22) PCT Filed: Nov. 26, 2019

(86) PCT No.: PCT/KR2019/016333
§ 371 (c)(1),
(2) Date: May 20, 2021

(87) PCT Pub. No.: WO2020/111712
PCT Pub. Date: Jun. 4, 2020

(65) Prior Publication Data
US 2022/0018834 A1  Jan. 20, 2022

(30) Foreign Application Priority Data
Nov. 26, 2018  (KR) .................. 10-2018-0147292

(51) Int. Cl.
G01N 33/543  (2006.01)
G01N 33/52   (2006.01)
G01N 33/552  (2006.01)

(52) U.S. Cl.
CPC ....... *G01N 33/54393* (2013.01); *G01N 33/52* (2013.01); *G01N 33/54366* (2013.01); *G01N 33/552* (2013.01); *G01N 2610/00* (2013.01)

(58) Field of Classification Search
CPC .................. G01N 33/54366; G01N 33/54393
See application file for complete search history.

(56) References Cited

U.S. PATENT DOCUMENTS

| 4,689,310 A | 8/1987 | Kramer et al. |
| 5,741,654 A | 4/1998 | Michel et al. |
| 2002/0132272 A1* | 9/2002 | Wagner ............ G01N 33/54393 435/7.9 |

(Continued)

FOREIGN PATENT DOCUMENTS

| JP | H09504374 A | 4/1997 |
| JP | H11242031 A | 9/1999 |
| KR | 20030025787 A | 3/2003 |

(Continued)

OTHER PUBLICATIONS

Arroyo-Hernandez M et al: "Formation of amine functionalized films by chemical vapour deposition", Materials Science and Engineering C, Elsevier Science S.A, CH, vol. 26, No. 5-7, Jul. 1, 2006 (Jul. 1, 2006). 4 pgs.

(Continued)

*Primary Examiner* — Natalia Levkovich
(74) *Attorney, Agent, or Firm* — Lerner David LLP

(57) ABSTRACT

A biosensor with improved detection sensitivity of a target substance, a method for preparing a biosensor with improved detection sensitivity, and a method for detecting a target substance using the biosensor.

6 Claims, 3 Drawing Sheets

(56) References Cited

U.S. PATENT DOCUMENTS

2010/0260679 A1* 10/2010 Shachar ............ G01N 33/48
424/9.1
2010/0330278 A1    12/2010   Choi et al.

FOREIGN PATENT DOCUMENTS

| KR | 101100380 B1 | 12/2011 |
|---|---|---|
| KR | 20140145572 A | 12/2014 |
| KR | 20150123391 A | 11/2015 |
| WO | 2014056896 A2 | 4/2014 |

OTHER PUBLICATIONS

Vladimir Gubala et al: "Simple approach to study biomolecule adsorption in polymeric microfluidic channels", Analytica Chimica Acta, vol. 760, Jan. 1, 2013 (Jan. 1, 2013). 8 pgs.

Ram Prasad Gandhiraman et al: "PECVD coatings for functionalization of point-of-care biosensor surfaces", Vacuum, vol. 86, No. 5, Aug. 29, 2011 (Aug. 29, 2011). 9 pgs.

"Sandeep Kumar Vashist et al: ""Immobilization of Antibodies and Enzymes on 3-Aminopropyltriethoxysilane-Functionalized Bioanalytical Platforms for Biosensors and Diagnostics"", Chemical Reviews, vol. 114, No. 21, Oct. 9, 2014 (Oct. 9, 2014). 48 pgs."

"Vashist Sandeep K. et al: ""Antibody Immobilization and Surface Fuctionalization Chemistries for Immunodiagnostics"" In: ""Handbook of Immunoassay Technologies: Approaches, Performances, and Applications""", Jan. 1, 2018 (Jan. 1, 2018). 28 pgs."

"Jonsson U et al: ""Chemical vapour deposition of silanes""", Thin Solid Films, Elsevier, Amsterdam, NL, vol. 124, No. 2, Feb. 8, 1985 (Feb. 8, 1985). 7 pgs."

"Kim Wan-Joong et al: ""Sensilive ""capillary ELISA"" via vapor-phase surface modfication""", Sensors and Actuators B : Chemical, Elsevier BV, NL, vol. 233, Apr. 22, 2016 (Apr. 22, 2016) 8 pgs."

Extended Search Report for Application No. 19890467.4 dated Jan. 27, 2022. 15 pgs.

Sepulveda, D. et al., "Bioelectrochemical Detection of Mycobacterium tuberculosis ESAT-6 in an Antibody-Based Biomicrosystem", Sensors, Sep. 2017, pp. 1-14, vol. 17, No. 10.

European Communication for App No. 19 890 467.4, dated Feb. 20, 2024, pp. 1-10.

Arroyo-Hernandez, M. et al. "Formation of amine functionalized films by chemical vapour deposition", Material Science and Engineering C, Available Online Oct. 14, 2005, pp. 938-941, vol. 26, Elsevier, Madrid, Spain.

International Search Report for Application No. PCT/KR2019/016333 dated Mar. 4, 2020, pp. 1-3.

Presnova, G et al., "Biosensors based on a silicon nanowire field effect transistor functionalized by gold nanoparticles for the highly sensitive determination of prostate specific antigen", Biosensors and Bioelectronics, available online Aug. 18, 2016, pp. 283-289, vol. 88, Elsevier, Moscow, Russia.

Presnova, G. V. et al., "Oriented Immobilization of Antibodies and Their Fragments on Modified Silicon for the Production of Nanosensors", Moscow University Chemistry Bulletin, Received Dec. 1, 2015, pp. 110-115, vol. 71, No. 2, Russia.

* cited by examiner

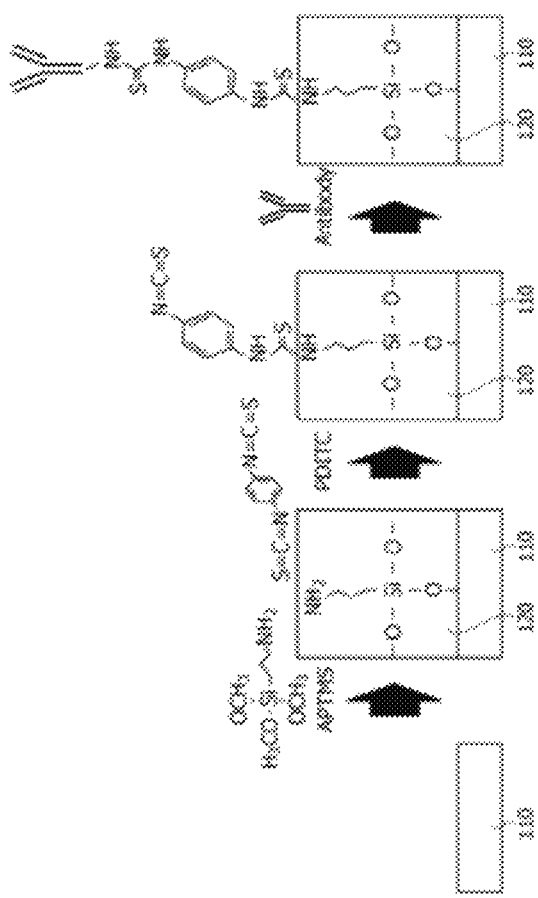

[Figure 3]
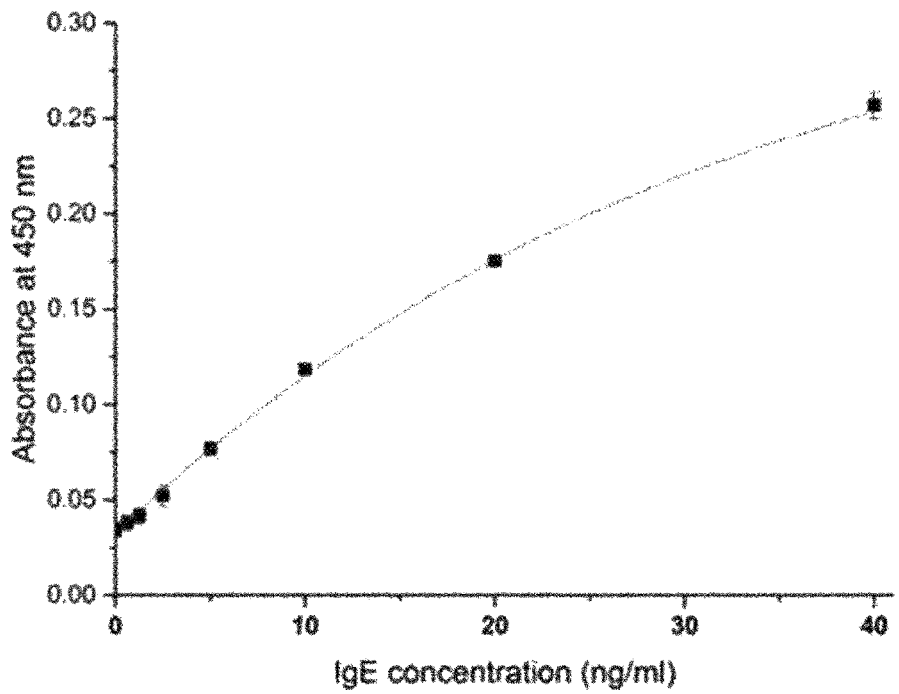
[Figure 4]
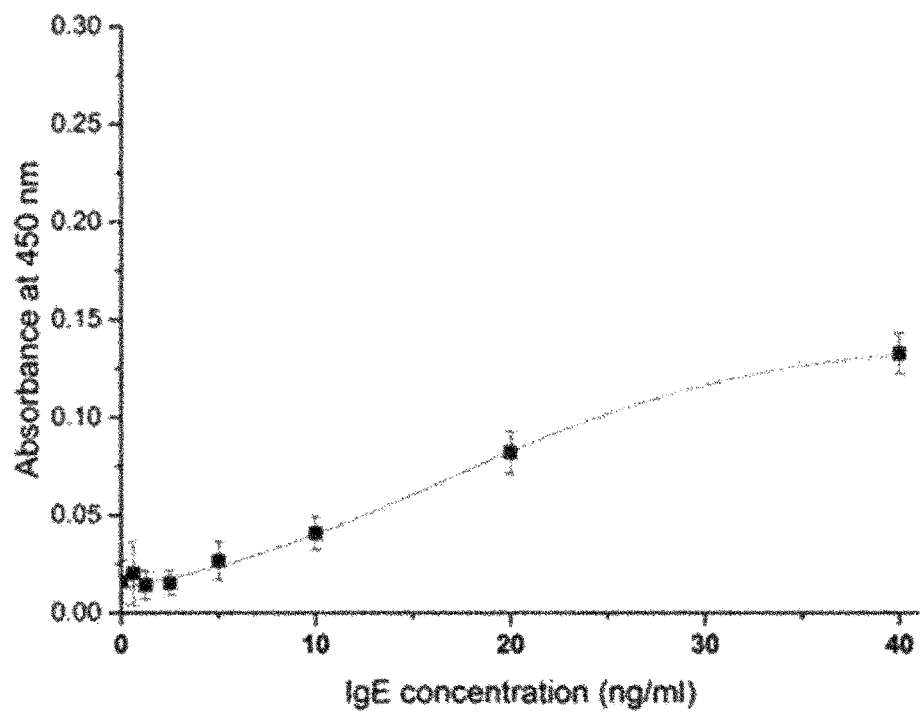

BIOSENSOR AND PREPARATION METHOD THEREOF

CROSS-REFERENCE TO RELATED APPLICATIONS

The present application is a national phase entry under 35 U.S.C. § 371 of International Application No. PCT/KR2019/016333 filed Nov. 26, 2019, published in Korean, which claims priority from 10-2018-0147292 filed Nov. 26, 2018, all of which are incorporated herein by reference.

TECHNICAL FIELD

This application claims the benefit of priority based on Korean Patent Application No. 10-2018-0147292 filed on Nov. 26, 2018, the disclosure of which is incorporated herein by reference in its entirety.

The present application relates to a biosensor and a method for preparing the same.

BACKGROUND ART

Immunoanalytical methods are analytical methods based on antigen-antibody binding reactions. A representative form of the immunoanaytical methods is an enzyme-linked immunosorbent assay (ELISA), which is the most commonly used immunodiagnostic method.

The enzyme-linked immunosorbent assay generally detects a target substance by immobilizing an antibody in a surface-treated substrate. On the other hand, as the surface treatment method of the substrate, a liquid phase process is used, in which the substrate is immersed in a solution containing a substance to be treated on the surface. However, the liquid phase process has an advantage of being easy to perform, whereas it has disadvantages that the surface treatment of the substrate is somewhat uneven and the treated substance has a low density. As a result, there has been a problem that the density of the antibody immobilized in the substrate is lowered and uneven, thereby lowering detection sensitivity of the target substance of the biosensor.

Accordingly, there is a need for a biosensor having improved detection sensitivity of a target substance.

SUMMARY

Technical Problem

It is an object of the present application to provide a biosensor with improved detection sensitivity of a target substance. It is another object of the present application to provide a method for preparing a biosensor with improved detection sensitivity.

Technical Solution

Among physical properties mentioned in this specification, when the measured temperature affects the results, the relevant physical properties are physical properties measured at room temperature, unless otherwise specified. The term room temperature is a natural temperature without being heated or cooled, which may be, for example, any temperature in a range of 10° C. to 30° C., or about 23° C. or about 25° C. or so. In addition, unless otherwise specified herein, the unit of temperature is ° C.

Among physical properties mentioned in this specification, when the measured pressure affects the results, the relevant physical properties are physical properties measured at room pressure, unless otherwise specified. The term normal pressure is a natural pressure without being pressurized or depressurized, where usually about 1 atm or so is referred to as the normal pressure.

In one example of the present application, the present application relates to a biosensor for detecting a target substance.

The biosensor of the present application comprises a base material; a support layer formed on a first side of the base material; and a first antibody immobilized in the support layer, wherein the support layer formed on the first side of the base material is a self-assembled monolayer formed by a vapor deposition method.

As one example, the base material is not particularly limited, which may be, for example, a polymer substrate, a metal substrate, a metal oxide substrate or a glass substrate.

As the polymer substrate, for example, a polycarbonate, polymethyl methacrylate (PMMA), or polypropylene substrate may be used, without being limited thereto. As the metal substrate, for example, an aluminum, iron or gold substrate may be used, without being limited thereto. As the metal oxide substrate, an $Al_2O_3$, ZnO, $Fe_3O_4$, $ZrO_2$, $TiO_2$, SnO or ITO (indium tin oxide) substrate may be used, without being limited thereto. As the glass substrate, a quartz glass, soda-lime glass, borosilicate glass, crystal glass, aluminosilicate glass or germanium-oxide glass substrate may be used, without being limited thereto.

As one example, the support layer may be formed on one side of the base material.

The method of forming the support layer on one side of the base material may be by a vapor deposition method, and specifically, may be formed by a molecular layer deposition (MLD) method to be described below.

As one example, the first antibody immobilized in the support layer is not particularly limited, where an appropriate antibody may be selected in consideration of the target substance to be detected.

Specifically, an antibody having a binding site capable of binding to a target substance may be selected as the first antibody. Therefore, the first antibody may vary depending on the target substance to be detected. On the other hand, the type of the first antibody is not particularly limited, which may be, for example, IgE, IgD or IgG.

The term target substance may mean an antigen as a substance capable of binding to a binding site of an antibody.

As one example, the support layer formed on one side of the base material may be a self-assembled monolayer formed by a vapor deposition method. In general, the self-assembled monolayer means a molecular assembly spontaneously formed on a surface by adsorption without the help of specific enzymes or factors. Therefore, in the present application, the self-assembled monolayer may mean a molecular assembly spontaneously formed on one side of a base material by adsorption. When the support layer of the biosensor is a self-assembled monolayer (SAM), it is advantageous to uniformly attach the first antibody to the support layer.

As one example, the biosensor of the present application may have absorbance satisfying the following equation 1.

$$Ab \geq 0.15 \qquad \text{[Equation 1]}$$

In Equation 1 above, Ab is the absorbance at the maximum absorption wavelength measured using a UV-Vis spectrophotometer after contacting 100 μL of a solution containing 20 ng/mL to 40 ng/mL of a target substance with the support layer in which the first antibody is immobilized, and then contacting a second antibody capable of binding to the target substance and bound by an enzyme reacting with TMB (3,3',5,5'-tetramethylbenzidine).

In Equation 1 above, an area of the support layer, in which the first antibody is immobilized, may be about 8 cm wide and about 2 cm long.

In Equation 1 above, the 20 ng/mL to 40 ng/mL may mean, for example, about 20 ng/mL 22 ng/mL, 24 ng/mL, 26 ng/mL, 28 ng/mL, 30 ng/mL, 32 ng/mL, 34 ng/mL, 36 ng/mL, 38 ng/mL or about 40 ng/mL.

In Equation 1 above, as the solution containing a target substance, phosphate-buffered saline (PBS) may be used.

In Equation 1 above, after reaction from the time when a target substance has been contacted to any one time when about 50 minutes to about 70 minutes have elapsed, for example, from the time when a test substance has been contacted to the time when about 55 minutes, about 60 minutes or about 65 minutes have elapsed, the second antibody capable of binding to the target substance and bound by an enzyme reacting with TMB (3,3',5,5'-tetramethylbenzidine) may be contacted.

On the other hand, in order to remove a solution containing a target substance not bound to the first antibody, a washing process may be performed before contacting the second antibody. The washing process is not particularly limited, where it may be washed using a known washing solution. For example, as the washing solution, PBS (phosphate-buffered saline)-Tween may be used.

In Equation 1 above, the second antibody capable of binding to a target substance and bound by an enzyme reacting with TMB (3,3',5,5'-tetramethylbenzidine) is not particularly limited, where an appropriate antibody may be selected in consideration of the target substance to be detected. Specifically, an antibody having a binding site capable of binding to the target substance bound to the first antibody may be selected as the second antibody. Thus, the binding site of the second antibody may be bound by reacting with the target substance bound to the first antibody. On the other hand, the second antibody may be contacted in an amount to be capable of sufficiently reacting with the target substance bound to the first antibody. For example, about 100 μL of a solution containing 1 μg/mL of the second antibody may be contacted. The type of the second antibody is not particularly limited, which may be, for example, IgE, IgD or IgG.

On the other hand, as the enzyme bound to the second antibody, a known enzyme capable of reacting with TMB (3,3',5,5'-tetramethylbenzidine) may be used. For example, the enzyme may be horseradish peroxidase (HRP).

In Equation 1 above, after reaction from the time when the second antibody has been contacted to any one time when about 50 minutes to about 70 minutes have elapsed, for example, from the time when the second antibody has been contacted to the time when about 55 minutes, about 60 minutes or about 65 minutes have elapsed, TMB (3,3',5,5'-tetramethylbenzidine) may be contacted. On the other hand, the TMB (3,3',5,5'-tetramethylbenzidine) may be contacted in an amount of about 100 μL (0.1 mg/mL).

In Equation 1 above, in the measurement of absorbance, it may be measured using a UV-Vis spectrophotometer after reaction from the time when TMB (3,3',5,5'-tetramethylbenzidine) has been contacted to any one time when 10 minutes to 20 minutes have elapsed, for example, from the time when TMB (3,3',5,5'-tetramethylbenzidine) has been contacted to the time when about 12 minutes, 13 minutes, 14 minutes, 15 minutes, 16 minutes, 17 minutes or 18 minutes have elapsed.

In Equation 1 above, in another example, the absorbance (Ab) may be about 0.16 or more, 0.17 or more, or about 0.18 or more, and the upper limit is not particularly limited, but may be about 0.3 or less, 0.29 or less, 0.28 or less, or about 0.27 or less.

The absorbance in such a range means that the amount of the enzyme immobilized in the second antibody reacting with TMB is high, which means that the amount of the target substance bound to the first antibody is high. In addition, this may mean that the first antibody immobilized in the support layer has a high density. Therefore, the biosensor having absorbance in the above range has high detection sensitivity of the target substance.

As one example, the absorbance of the biosensor may be configured to detect the target substance at a concentration in a range of 0.6 ng/mL to 1.0 ng/mL. Specifically, when the concentration of the target substance increases in the range of 0.6 ng/mL to 1.0 ng/mL, the absorbance also increases. Thus, the biosensor of the present application can also detect quantitatively a target substance in such a very low concentration range.

As one example, the forming material of the support layer forming the support layer formed on the first side of the base material may comprise a compound represented by the following formula 1.

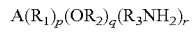

$$A(R_1)_p(OR_2)_q(R_3NH_2)_r$$ [Formula 1]

In Formula 1 above, A is a carbon atom, a silicon atom or a germanium atom, $R_1$ is a first alkyl group having 1 to 5 carbon atoms, $R_2$ is second alkyl group having 1 to 5 carbon atoms, $R_3$ is a third alkylene group having 1 to 12 carbon atoms or a phenylene group, p is an integer between 0 to 2, r is a natural number between 1 to 3, q is a natural number between 1 to 3, and a sum of p, q and r equals 4.

In Formula 1 above, in another example, $R_1$ and $R_2$ may be each independently an alkyl group having 1 to 4 carbon atoms or an alkyl group having 1 to 3 carbon atoms.

In Formula 1 above, in another example, $R_3$ may be an alkylene group having 1 to 10 carbon atoms, 1 to 8 carbon atoms, 1 to 6 carbon atoms or 1 to 4 carbon atoms, or a phenylene group.

In Formula 1 above, p may be an integer of 0, 1 or 2.

In Formula 1 above, r and q may be each independently a natural number of 1, 2 or 3.

In Formula 1 above, the sum of p, q and r satisfies 4. That is, it satisfies p+q+r=4.

As one example, the kind of the compound represented by Formula 1 above is not particularly limited, but it may be, for example, (4-aminobutyl)triethoxysilane, (4-aminobutyl)trimethoxysilane, aminophenyltriethoxysilane, aminophenyltrimethoxysilane, (3-aminopropyl)trimethoxysilane, (3-aminopropyl)triethoxysilane or (3-aminopropyl) dimethylethoxysilane.

When the support layer is formed using the compound represented by Formula 1 above, it is advantageous to form a self-assembled monolayer on one side of the base material.

As one example, the density of the support layer formed on one side of the base material may be 800 pieces/μm² to 2,000 pieces/μm². As another example, it may be about 850 pieces/μm² or more, 900 pieces/μm² or more, 950 pieces/μm² or more, 1,000 pieces/μm² or more, or about 1,100 pieces/μm² or more. The upper limit is not particularly limited, but may be about 1,900 pieces/μm² or less, or 1,800 pieces/μm² or less, 1,700 pieces/μm² or less. The support layer having a density in the above range can immobilize the first antibody in the support layer at a high density. Therefore, the biosensor comprising the support layer having such a density range can immobilize the first antibody in the support layer at a high density, thereby improving the measurement sensitivity of the biosensor.

The method of measuring the density of the support layer formed on one side of the base material is not particularly limited, and for example, the adsorption density of the support layer can be measured with a scanning electron microscope (SEM) by binding biotin to the support layer with EDC coupling, and using selectively adsorbing properties of streptavidin, to which 20 nm gold nanoparticles are bonded, and the biotin.

The present application also relates to a method for preparing a biosensor. Furthermore, as a base material, a forming material of a support layer for forming the support layer and a first antibody immobilized in the support layer, which are used for the method for preparing a biosensor of the present application, the base material, the forming material of the support layer and the first antibody as described above may be used.

The biosensor preparation method of the present application comprises forming a support layer, which is a self-assembled monolayer, on a first side of a base material by a vapor deposition method; and subsequently immobilizing a first antibody in the support layer.

As one example, in the first step, a method of forming a support layer, which is a self-assembled monolayer, on one side of a base material may be performed by a vapor deposition method. Specifically, the support layer may be formed on one side of a base material by molecular layer deposition (MLD).

The molecular layer deposition may be performed using molecular layer deposition equipment (1) as in FIG. 1. As shown in FIG. 1, the molecular layer deposition equipment (1) may comprise a reaction chamber (10), a reaction tank (30), a gas connecting pipe (40) for connecting the reaction chamber and the reaction tank, a vacuum pump (50) for adjusting the pressure of the reaction chamber, a first heat source (20) for adjusting the temperature of the reaction tank, a second heat source (60) for adjusting the temperature of the reaction chamber, a first valve (70), provided in the gas connecting pipe (40), for adjusting the flow rate of the vaporized forming material of the support layer flowing into the reaction chamber (10), a second valve (80), provided in the vacuum pump (50), for adjusting the pressure of the reaction chamber (10), and a third valve (90) for adjusting the pressure of the reaction chamber (10) to normal pressure.

First, a base material may be safely placed in the reaction chamber of the molecular layer deposition equipment (1), and a forming material of a support layer may be charged in the reaction tank.

Thereafter, the temperature of the reaction tank (30) may be adjusted to a temperature higher than the boiling point of the forming material of the support layer by the first heat source (20) provided in the reaction tank (30), and for example, the temperature of the reaction tank (30) may be adjusted to a temperature range of 50° C. to 500° C. The first heat source (20) is not particularly limited, but may be an electric heater as one example. The first heat source (20) may vaporize the forming material of the support layer by adjusting the temperature of the reaction tank (30) to a temperature higher than the boiling point of the forming material of the support layer charged in the reaction tank (30). The vaporized forming material of the support layer may be introduced into the reaction chamber (10) through the gas connecting pipe (40). At this time, the first valve (70) may adjust the opening and closing time of the valve to adjust the flow rate of the vaporized forming material of the support layer. For example, the flow rate of the vaporized forming material of the support layer may be adjusted by opening the first valve for about 40 seconds to about 80 seconds so that the vaporized forming material of the support layer in the reaction tank is introduced into the reaction chamber through the gas connecting pipe. If the opening time of the first valve is short, the support layer with a sufficient density may not be deposited on the base material, and if the opening time is long, the forming material of the support layer may be wasted because the vaporized forming material of the support layer flowing into the reaction chamber increases.

On the other hand, the temperature of the reaction chamber may be adjusted to a range of about 40° C. to about 200° C. by the second heat source (60) provided in the reaction chamber. The second heat source (60) may be an electric heater of the same type as the above-described electric heater. The second heat source (60) serves to provide the reaction chamber (10) with a high temperature while the vaporized forming material of the support layer is deposited in the reaction chamber (10), where the high temperature may be appropriately selected within the above temperature range in consideration of the type of the forming material of the support layer and the desired adsorption density of the support layer. On the other hand, the deposition of the forming material of the support layer may be performed for about 10 minutes to about 60 minutes. When the deposition is performed in the above range, the support layer may be efficiently deposited as a self-assembled monolayer without wasting time while having a high density on the base material.

The pressure of the reaction chamber (10) may be adjusted by the vacuum pump (50) and the second valve (80) provided in the vacuum pump. When the second valve is opened, a negative pressure may be applied to the inside of the reaction chamber (10). The second valve (80) may be opened so that the inside of the reaction chamber (10) becomes a vacuum atmosphere before the forming material of the support layer is deposited on the base material (11). In addition, the second valve (80) may be closed while the first valve is opened and the vaporized forming material of the support layer flows into the reaction chamber (10).

Furthermore, the pressure of the reaction chamber (10) may also be adjusted by the third valve (90). For example, the third valve (90) may be closed in order to maintain the inside of the reaction chamber (10) in a vacuum atmosphere. On the other hand, when the third valve (90) is opened, the pressure of the reaction chamber (10) may be adjusted to normal pressure. Specifically, when the base material (11), on which the support layer is formed, is taken out of the reaction chamber (10), the third valve (90) may be opened to adjust the pressure of the reaction chamber (10) to normal pressure. As described above, by opening the third valve (90) to adjust the pressure of the reaction chamber (10) to normal pressure, the forming material of the support layer remaining without being deposited on the base material (11) may be effectively removed from the reaction chamber (10).

When the support layer is deposited on one side of the base material by the molecular layer deposition as above, the support layer, which is a self-assembled monolayer having a high density, may be deposited. Therefore, the biosensor comprising the support layer may improve the detection sensitivity of the target substance.

In one example, in the method of immobilizing the first antibody in the support layer in the second step, it may be immobilized in the support layer via a linking medium. Specifically, the first antibody may be immobilized in the support layer by binding a linking medium to the support layer, and then binding the first antibody to the linking medium.

The linking medium is not particularly limited, but may be, as one example, glutaraldehyde 1,4-butanediol diglycidyl ether, N,N'-disuccinimidyl carbonate or p-phenylene diisocyanate.

The method of binding the linking medium to the support layer is not particularly limited, where it may be bound by a known method. In one embodiment, the linking medium may be bound to the support layer by reacting with a solution containing p-phenylene diisocyanate.

On the other hand, the method of binding the first antibody to the linking medium is not particularly limited, where it may be attached by a known method. In one embodiment, the first antibody may be attached to the linking medium by contacting the solution containing the first antibody with the base material, on which the linking medium is formed, so that the linking medium and the first antibody react.

The present application also relates to a method for detecting a target substance. The method for detecting a target substance of the present application comprises contacting a test subject substance comprising a target substance, a substrate, and a second antibody in which an enzyme reacting with the substrate is immobilized with a biosensor as in any of the embodiments described herein, and measuring changes in the substrate in contact with the biosensor. In one example, as the biosensor, the above-described biosensor may be used. Therefore, the detection sensitivity of the target substance may be improved. That is, a trace amount of the target substance may also be detected with high sensitivity.

As one example, the test subject substance comprising a target substance in the first step is not particularly limited, which may be, for example, derived from a human body. In one embodiment, the test subject substance may be sweat, blood, serum, plasma, cerebrospinal fluid, saliva, tears, nasal discharge or urine, and the like. Such a test subject substance may be appropriately selected in consideration of the concentration of the target substance included in the test subject substance. On the other hand, the target substance may mean an antigen that is a material capable of being bound to the binding site of the antibody.

As one example, the second antibody, in which an enzyme reacting with a substrate is immobilized, and the substrate in the first step may be the same as the second antibody and the substrate as described above.

As one example, in the first step, the test subject substance comprising a target substance, the second antibody, in which an enzyme reacting with a substrate is immobilized, and the substrate may be sequentially contacted with the biosensor. Specifically, the test subject substance comprising a target substance may be contacted with a biosensor, and then the second antibody, in which an enzyme reacting with a substrate is immobilized, may be contacted with the biosensor, and finally, the substrate may be contacted with the biosensor.

On the other hand, after contacting the test subject substance comprising a target substance with a biosensor in the first step, a washing process of washing the biosensor may be included. In addition, after contacting the second antibody, in which an enzyme reacting with a substrate is immobilized, with the biosensor, a washing process for washing the biosensor may be included. Through such a series of washing processes, it is possible to improve the detection accuracy of the target substance.

The method of measuring changes in the substrate in the second step is not particularly limited, but for example, the change of the substrate may be measured by an optical method. Specifically, in the case of using a chromogen reacting with an enzyme bound to a second antibody to develop colors as a substrate, the change of the substrate by the enzyme immobilized in the second antibody may be measured by measuring the absorbance of the chromogen. Furthermore, the measurement of the absorbance is not particularly limited, but it may be measured using a known spectrophotometer.

By measuring the change of the substrate, it is possible to quantitatively analyzing the target substance. Specifically, data may be constructed by measuring absorbance (hereinafter, may be referred to as 'standard absorbance') according to the content of the target substance. By comparing the standard absorbance of the constructed data with the absorbance of the test subject substance, it is possible to determine the content of the target substance contained in the test subject substance.

Advantageous Effects

According to one example of the present application, a biosensor having improved detection sensitivity of a target substance is provided. Also, a method for preparing a biosensor with improved detection sensitivity of a target substance is provided. In addition, a method for detecting a target substance using the biosensor is provided.

BRIEF DESCRIPTION OF THE DRAWINGS

FIG. 2 is an exemplary conceptual diagram showing a series of processes for manufacturing the biosensor of Example.

FIG. 3 is a graph showing absorbance at the maximum absorption wavelength (wavelength of about 450 nm) measured with a UV-Vis spectrophotometer according to concentrations of a target substance using the biosensor prepared through Example.

FIG. 4 is a graph showing absorbance at the maximum absorption wavelength (wavelength of about 450 nm) measured with a UV-Vis spectrophotometer according to concentrations of a target substance using the biosensor prepared through Comparative Example.

DETAILED DESCRIPTION

Figure 1:
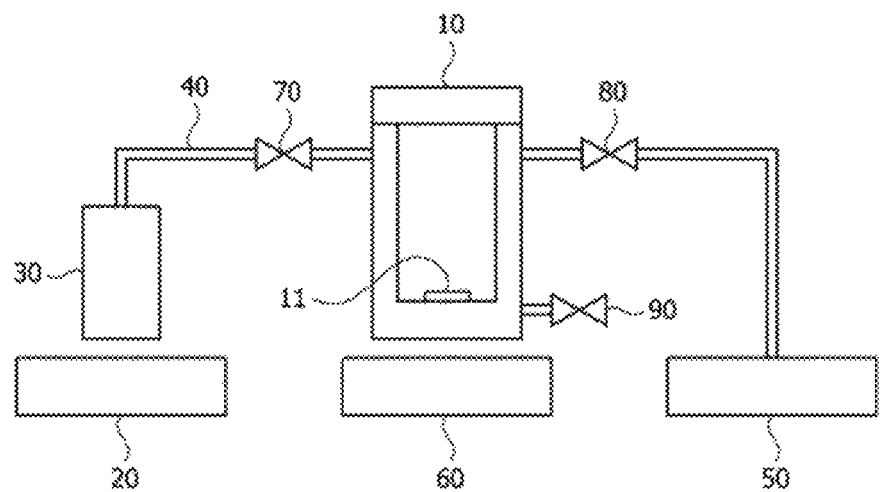
FIG. 1 is a conceptual diagram illustrating exemplary vapor deposition equipment that may be used in a method for preparing a biosensor.

Hereinafter, the present application will be described in detail with reference to examples, but the scope of the present application is not limited by the following examples.
Absorbance Measurement The biosensors prepared through examples and comparative examples were washed four times with 1% PBS and 0.05% Tween 20, blocked with 1% BSA (bovine serum albumin) for 1 hour, and then washed four times.

Thereafter, about 100 μL of IgE (NIBSC, 11/234) (20 ng/mL) as a target substance was added thereto, reacted for 1 hour, and then washed four times, and about 100 μL of an anti-human IgE antibody (manufacturer: Goma Biotech, product name: IgE, Anti-Human, HRP) (1 μg/mL), in which HRP (horseradish peroxidase) was immobilized, as a second antibody was added thereto, reacted for 1 hour, and then washed four times. Then, about 100 μL of TMB (3,3',5,5'- tetramethylbenzidine) (0.1 mg/mL) as a substrate was added thereto, reacted for 15 minutes, and then about 100 μL of 2M $H_2SO_4$ was added thereto.

Thereafter, the absorbance was measured using a UV-Vis spectrophotometer (Agilent, Cary 8454).

Example

Forming Material of Biosensor

Base material: A glass substrate (8 cm×2 cm) (Sewon Tech, Soda-lime glass) was used as the base material.

Forming material of support layer: (3-aminopropyl) trimethoxysilane (APTMS) (Sigma-Aldrich, 281778) was used.

Linking medium: p-phenylene diisocyanate (Sigma-Aldrich, 258555) was used.

First antibody: Anti-human IgE antibody (ThermoFisher Scientific, A18797) was used.

Manufacture of Biosensor

Formation of Support Layer on Base Material:

The glass substrate 110 was safely placed in the reaction chamber of the vapor deposition equipment configured as shown in FIG. 1, the second valve was opened to form the reaction chamber in a vacuum atmosphere, and the temperature of the reaction chamber was maintained at about 100° C. using the second heat source. Furthermore, (3-aminopropyl) trimethoxysilane (APTMS), which was a forming material of the support layer 120, was charged in the reaction tank, and then APTMS was vaporized by heating the temperature of the reaction tank to 100° C. using the first heat source. The first valve was opened for about 60 seconds so that the vaporized APTMS flowed into the reaction chamber, and again, the first valve was closed and then held for 10 minutes to deposit APTMS on the glass substrate 110, thereby forming a support layer 120 as a self-assembled monolayer.

The second valve was opened and the temperature of the reaction chamber was lowered to room temperature. Thereafter, the second valve was closed and the third valve was opened to convert the pressure of the reaction chamber to normal pressure, and then the base material, on which the support layer 120 was formed, was collected from the reaction chamber.

Immobilization of First Antibody in Support Layer:

The glass substrate 110, on which the support layer 120 was formed, was supported on a 0.2% p-phenylene diisocyanate solution (in DMF/pyridine 9:1) for 2 hours.

Thereafter, about 100 μL of the first antibody (1 μg/mL) was reacted for 1 hour to immobilize the antibody in the support layer 120.

FIG. 2 is an exemplary conceptual diagram showing a series of processes for manufacturing a biosensor of an example. The absorbance was measured using the biosensor of Example prepared by the same method as above.

Comparative Example

Forming Material of Biosensor

The base material, the forming material of the support layer and the first antibody, which were the same as those of Example 1, were used.

Manufacture of Biosensor

Formation of Support Layer on Base Material:

Using a liquid phase deposition method of a glass substrate, the support layer was formed on the glass substrate. Specifically, the glass substrate was immersed in ethanol containing 1% (3-aminopropyl)trimethoxysilane (APTMS), which was a forming material of a support layer, for about 2 hours to form a support layer on the base material. Thereafter, the base material, on which the support layer was formed, was collected by washing it with ethanol for about 10 seconds.

Immobilization of First Antibody in Support Layer:

The first antibody was immobilized in the support layer in the same manner as in Example.

The absorbance was measured using the biosensor of Comparative Example prepared in the same method as above.

Evaluation Results

FIG. 3 is a graph showing absorbance at the maximum absorption wavelength (wavelength of about 450 nm) measured with a UV-Vis spectrophotometer (path length: 1 cm) according to concentrations of a target substance using the biosensor prepared through Example, and FIG. 4 is a graph showing absorbance at the maximum absorption wavelength (wavelength of about 450 nm) measured with a UV-Vis spectrophotometer (path length: 1 cm) according to concentrations of a target substance using the biosensor prepared through Comparative Example.

As shown in FIGS. 3 and 4, as a result of analyzing the absorbance of the biosensor prepared in Example, the absorbance was found to be high as about 0.175 at 20 ng/mL of the target substance. However, as a result of analyzing the absorbance of the biosensor prepared in Comparative Example, the absorbance was found to be low as about 0.08 at 20 ng/mL of the target substance. Through this, it could be confirmed that the detection sensitivity of the biosensor prepared in Example was significantly higher than the detection sensitivity of the biosensor prepared in Comparative Example.

The invention claimed is:

1. A biosensor comprising:
    a substrate of a base material;
    a support layer formed on a surface of the substrate; and
    a plurality of first antibodies, each first antibody immobilized in a respective piece of the support layer,
    wherein the support layer formed on the surface of the substrate is a self-assembled monolayer formed by a vapor deposition method, and
    wherein the support layer has a density of 800 pieces/μm² to 2,000 pieces/μm².

2. The biosensor according to claim 1, wherein an absorbance of the biosensor is greater than or equal to 0.15 at a maximum absorption wavelength measured using a UV-Vis spectrophotometer after contacting 100 μL of a solution containing 20 ng/ml to 40 ng/ml of a target substance with the support layer in which the first antibodies are immobilized, and then contacting one or more second antibodies capable of binding to the target substance and bound by an enzyme reacting with TMB (3,3',5,5'-tetramethylbenzidine).

3. The biosensor according to claim 2, wherein the biosensor is configured to detect the target substance at a concentration in a range of 0.6 ng/ml to 1.0 ng/mL.

4. The biosensor according to claim 1, wherein the base material is a polymer, a metal, a metal oxide or glass.

5. The biosensor according to claim 1, wherein the support layer is formed on the surface of the substrate from a compound represented by:

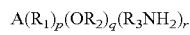

wherein, A is a carbon atom, a silicon atom or a germanium atom, $R_1$ is a first alkyl group having 1 to 5 carbon atoms, $R_2$ is second alkyl group having 1 to 5 carbon atoms, $R_3$ is a third alkylene group having 1 to 12 carbon atoms or a phenylene group, p is an integer between 0 to 2, r is a natural number between 1 to 3, q is a natural number between 1 to 3, and a sum of p, q and r equals 4.

6. The biosensor according to claim 5, wherein the compound represented by Formula 1 above is (4-aminobutyl) triethoxysilane, (4-aminobutyl) trimethoxysilane, aminophenyltriethoxysilane, aminophenyltrimethoxysilane, (3-aminopropyl) trimethoxysilane, (3-aminopropyl) triethoxysilane or (3-aminopropyl) dimethylethoxysilane.

* * * * *